Dec. 18, 1956  R. L. JENK ET AL  2,774,698
COMPOSITE BOARD

Filed May 12, 1953  2 Sheets-Sheet 1

ROBERT L. JENK
JOHN C. REDD
INVENTORS.

BY Irvin V. Gleim

Dec. 18, 1956  R. L. JENK ET AL  2,774,698
COMPOSITE BOARD

Filed May 12, 1953  2 Sheets—Sheet 2

ROBERT L. JENK
JOHN C. REDD
 INVENTORS.

BY *Irvin V. Gleim*

United States Patent Office 2,774,698
Patented Dec. 18, 1956

2,774,698
COMPOSITE BOARD

Robert L. Jenk and John C. Redd, Chillicothe, Ohio

Application May 12, 1953, Serial No. 354,445

4 Claims. (Cl. 154—45.9)

This invention relates to a composite board and the manufacture thereof, and more particularly pertains to a laminated dimensionally stable board structure especially suitable for use as panelboard for vehicle bodies, signboards, concrete forming boards and the like, and to methods of producing such a laminated structure, and is in the nature of an improvement upon the composite board product and methods described in our copending application Serial No. 269,046 filed January 30, 1952 for Composite Board, now abandoned, of which this is a continuation-in-part.

One of the principal objects of the present invention is to provide a composite panelboard for automobile bodies and the like which panelboard has unusually low moisture vapor and water sorption characteristics, and which retains high dimensional stability during long periods of use under varied conditions of humidity without objectionable warping, buckling or peeling.

Another object of the present invention is to provide such a composite panelboard having unusual heat stability characteristics when subjected to the high temperatures encountered during fabricating operations.

Another object of the present invention is to provide an inexpensive but highly satisfactory laminated board structure having a continuous moisture vapor, waterproof barrier on both sides thereof, which barrier is adapted to be secured to a finishing material such as a paper liner, various upholstery fabrics or other suitable trim materials.

Still another object of the present invention is to provide a composite product of the character described in which the moisture vapor, water-proof barrier is confined substantially between the outer surface of a foundation or filler board and the unexposed surface of a paper liner, forming an interposed or intercalated uniformly continuous layer or film between said surfaces.

Another object of the invention is to provide an inexpensive composite board material of high quality comprising a normally penetrable ply or plies of filler board base treated with material imparting to the filler board substantial resistance to penetration by coating compositions, the treated filler board being adhered to a film or layer, such as for example, a film or layer of polyethylene, substantially confined to the surfaces of the filler board base and exhibiting unusually good resistance to moisture vapor and water.

A further object of the invention is to provide an improved composite laminated self-supporting panel-like board structure or article having a protective liner adhesively secured to the board with a water and water-vapor proof barrier film or layer, the liner surface of said panel-like board structure being adapted to be secured by heat treatment, as for example by dielectric heating to a trim and/or fabric covering without destroying the barrier film or layer.

A further object of the invention is to provide an improved laminated self-supporting panel-like board structure or article having a water and water-vapor proof barrier film or layer, said barrier film or layer being adapted for heat bonding, such as dielectric bonding or bonding by steam or electrically heated platens, to a trim and/or a fabric covering without destroying the barrier film or layer.

Still another object of the invention is to provide such a composite laminated board material, which is dimensionally stable and such that it may be used and easily processed in connection with a dielectric medium, die-cutting, embossing, punching and pasting machines for producing automotive trim panels without objectionable penetration of the barrier film material through outside layers to thus avoid objectionable discoloration or staining of the visible surfaces.

Another object of the invention is to provide such a composite board material, which is particularly adaptable for use in connection with ordinary and ornamental stitching operations for producing interior trim panels without objectionable staining or penetration of the stitching by any of the components of the composite board material structure.

Still another object of the invention is to provide trim fabric panels particularly adaptable for ornamental installation on the interior of vehicle bodies, having a water and water-vapor proof barrier film or layer underneeath the trim fabric which barrier is resistant to solvents such as cleaning compounds and solutions.

It is also an object of the invention to provide economical and efficient methods of producing composite board materials of the character described in a continuous and rapid fashion.

Other objects and advantages of the invention will become evident from the following description, the accompanying drawings and the appended claims.

Figure 1:
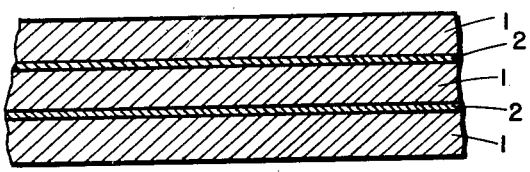
Fig. 1 is a fragmentary enlarged diagrammatic cross sectional view illustrating a ply board base element of the invention.
Figure 2:
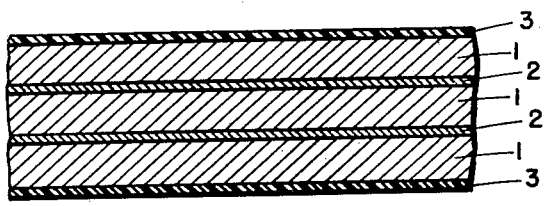
Fig. 2 is a fragmentary enlarged diagrammatic cross sectional view illustrating a step in a method of treating a base element such as that shown in Fig. 1 to form an embodiment of a dimensionally stable composite board of the invention.

In a preferred embodiment of the invention illustrated in the drawings, Figs. 1 and 2 illustrate a method of preparing a composite panel board in which a board filler element 1, which may for example comprise a single ply fiberboard produced on a conventional board forming machine from a pulp furnish of 85% old boxes, 15% semi-chemical chestnut pulp and 3% beater starch, is impregnated with a sizing such as rosin size, intimately incorporated in the fibers thereof. The beater starch as it occurs in the filler board, is of a slightly water-receptive character, and in addition to acting as a binder for holding the fibers together, functions as a moisture-retentive agent for maintaining small amounts of moisture in the filler board. The rosin size as used provides the filler board impervious or substantially water repellent and is generally of a proportion to give a lactic acid size test on board of from two to ten minutes and preferably from five to seven minutes. Such lactic acid size test essentially consists of measuring the average time in minutes for the adsorption of the first five of ten drops of 50% by weight lactic acid into the surface of the filler board when applied to the board filler element 1 from an eye dropper. In this test, a 50% aqueous solution of lactic acid is used instead of water since the adsorption of water is so slow that the drops applied to the board surface evaporate before they penetrate, whereas such 50% lactic acid shows a reasonable penetration time and is therefore more convenient and reliable. Filler boards such as those produced from a furnish of waste paper consisting of 47% kraft cuttings, 47% old boxes and 6% broke and other pulp furnishes may also be used for producing the board element 1.

To render an assembly of board elements resistant to water when it is desired to provide a structure of several plies as shown in Fig. 1, the board elements are adhesively united with an adhesive material or substance 2 which upon drying becomes insoluble in water. Substance 2 lightly impregnates and adhesively unites the board elements 1 and preferably consists of a resin type adhesive which, upon being applied to a suitable surface, first sets to a partially dried water receptive state and then to a fully dried water insoluble state and does not lose its adhesive strength when exposed to water during conditions of use.

Examples of such adhesive materials are starches modified with water dispersed urea formaldehyde condensation products sometimes referred to as urea formaldehyde resins, polyvinyl adhesives such as Du Pont No. 78, aqueous dispersions of proteins, as for example, soya protein and casein, and other water insoluble adhesive materials of this general character.

In applying adhesive material 2 to the board element 1, the rosin sizing provided therein serves a further useful purpose in preventing excess impregnation of the board by the resin adhesive thus assuring high bonding efficiency. Adequate amounts of the resin type adhesive material 2 are applied to the surface of the board, however, sufficient to render the board capable of withstanding exposure to water such as occurs during development and use in automotive vehicles, without significant stretching or shrinking or ply separation occuring. For most operations, it has been found that the amount of adhesive used for satisfactorily joining the filler board plies together is of the order of two pounds per thousand square feet for each such adhesive glue line.

Over the exposed surface of element 1, is applied a water and water vapor proof continuous barrier film or layer 3 as shown in Fig. 2. On the basis of extensive experimental work as well as commercial operations, a preferred example of a material of this character, which is particularly operative in this invention, is a continuous film of polyethylene resin, such resin being readily available on the market under the trade-name "Alathon -2" and manufactured by E. I. Du Pont de Nemours & Company.

Figure 6:
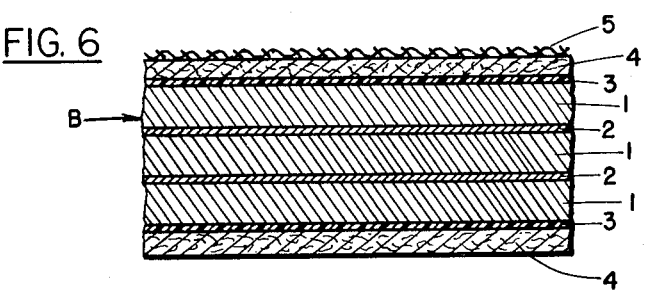
Fig. 6 is a fragmentary enlarged diagrammatic cross sectional view illustrating the step of securing a finishing material to one embodiment of the composite board of the invention.
Figure 7:
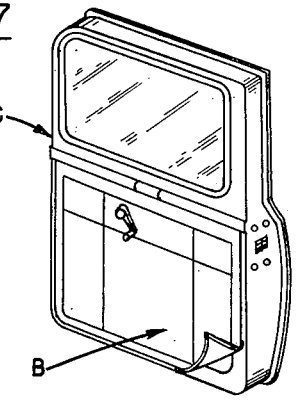
Fig. 7 is a perspective view of an automobile door with the composite board and finishing material of Fig. 5 applied thereto.

The amount of such a barrier film in the formation of a composite board structure of the present invention which was found especially suitable for use in the manufacture of panels illustrated in Figs. 6 and 7 for vehicle bodies, was of the order of 4 to 5 pounds per thousand square feet of board for each side of the finished composite board.

It has been found that other water and water vapor proof materials, as for example, metal foils, chlorinated rubbers, polyvinyl compounds and nitro and ethyl cellulose compounds may also be utilized to form such a continuous barrier film or layer 3 provided they are sufficiently water and water vapor proof so as to effectively limit or prevent the diffusion of liquid water or water vapor from the surface of the composite board structure into the filler board element 1. Further, such a barrier in accordance with this invention is sufficiently resistant to heat so as to retain the aforementioned functions at the highest temperature the composite board product may be subjected to during conditions of use of fabrication into trim panels.

When the composite board of this invention is assembled with an outer protective covering portion or liner 4 as more fully described hereinafter, the continuous barrier film or layer 3 provides sufficient adhesive strength under conditions of use to prevent separation of the protective liner from the rest of the structure, whereby forcible separation of the protective liner from the filler board produces rupture in the fibrous portions of the liner or filler rather than a splitting of the barrier film or layer. In addition, such a suitable barrier film or layer 3 preferably has a WVTR (water vapor transmission rate) of zero to two grams per one hundred square inches per twenty-four hours when exposed to 93% relative humidity on one surface and 25% relative humidity on the other surface, such determination being made at 100° F. Whereas, heat stability to ambient temperatures up to 170° F. has been found to be adequate for the use and fabrication of some automotive panels, the composite board of the present invention is characterized by having heat stability to relatively higher temperatures, as for example, of the order of 225° F.

Figure 3:
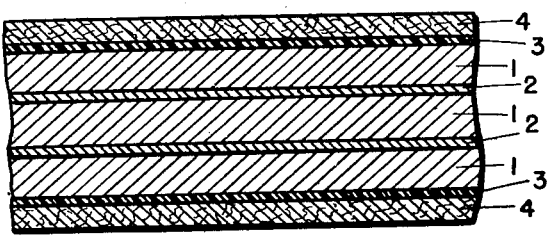
Fig. 3 is a fragmentary enlarged diagrammatic cross sectional view illustrating a step in a method of treating the composite board as shown in Fig. 2 to form another embodiment of a dimensionally stable composite board of the invention.
Figure 5:
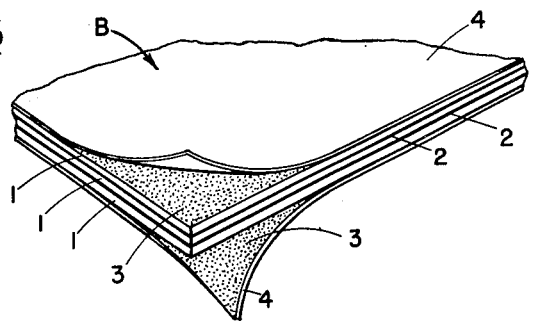
Fig. 5 is a perspective view of the composite board of the invention shown in Fig. 3 with partially peeled away portions to show the interior structure thereof.

If it is desired to protect and maintain the continuity of the moisture vapor, water-proof barrier film or layer 3, a protective covering portion 4 may be provided over such barrier and suitably joined thereto as by adhesively joining a paper liner 4 to the exposed surface of the element 1 with the water and water-vapor proof barrier film preferably functioning as the adhesive as illustratively shown in Figs. 3 and 5. The protective covering or liner 4 is one which is suitable for the intended use of the board product. In the production of panels, as for example, for interior automobile doors, a 26 lb. paper liner of bleached sulphite or bleached kraft grade referred to in the trade as 26 lb. waxing paper has been found very satisfactory. A very suitable liner paper for automobile door end use has been manufactured on a conventional paper machine from a furnish consisting of 54% bleached sulphite, 36% bleached sulphate and 10% broke which was made to a basis weight of 26 lbs. per ream (24 x 36—500 sheets). Such a liner was found to protect and maintain the continuity of the moisture vapor, water-proof barrier and in addition contributed to the assembled composite board by providing a surface which was clean, and which may be readily and easily printed, pasted and stacked.

With particular reference to Fig. 5, a preferred embodiment of the assembled dimentionally stable composite board structure of the invention is illustratively shown and designated generally by the reference character B, and includes a filler board structure composed of several plies of sized filler board elements 1 adhesively united by a resin type adhesive material 2, water and water vapor proof continuous barrier layers 3 applied to the exposed ply surfaces of the laminated filler board elements 1, and a protective covering 4 of liner paper adhesively united to each side of the assembled composite board structure by means of the barrier layers 3. An important aspect of this preferred form of the invention is the combination of a liquid water and moisture vapor proof barrier film or layer interposed or intercalated between a protective covering or liner material and a sized ply board material. It has been found that this interposed layer of barrier film furnishes a means of preventing or substantially prohibiting water vapor and liquid water from passing into the composite board of this invention. As illustrated by Tables I, II and III, when board structures are not repellent to liquid water and moisture vapor, a swelling of the cellulosic fibers of the board structure results with attendant unsatisfactory change in dimensions.

Figure 4:
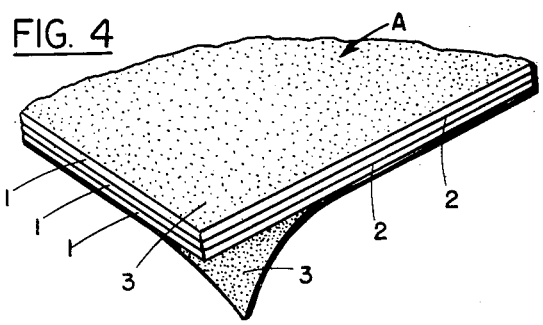
Fig. 4 is a perspective view of the composite board of the invention shown in Fig. 2.

Referring to Fig. 4, another embodiment of a very suitable dimensionally stable composite board constructed in accordance with the present invention is illustratively shown and designated by the reference character A, and except for the elimination of protective coverings, which were found to be unnecessary for some fabrication and/or trim operations, is substantially similar to the composite board structure B described above.

Composite boards similar to boards A and B shown in Fig. 4 and Fig. 5 were compared as to stability to water immersion with typical commercially known boards utilized as panelboard for vehicle bodies. The results of these comparisons are illustrated by Table I.

TABLE I

*Stability to 48 hour water immersion*

|  | Water Adsoprtion Wt. increase Percent after 48 hr. immersion | Dimensional Change, Inches per 36 in. (across machine) |
|---|---|---|
| Board A | 5.4 | .007 |
| Board A' | 5.4 | .014 |
| Board B | 2.2 | .071 |
| Board B' | 2.8 | .061 |
| Board C | 6.3 | .055 |
| Board C' | 5.8 | .020 |
| Board D | 17.4 | .373 |
| Board D' | 22.2 | .520 |

The weight of the boards illustrated by Table I as well as the boards of the following Tables II and III was of the order of 250 to 400 lbs. per one thousand sq. ft.; the boards designated A and A' set forth in the tables being generally referred to as polyethylene laminated with liner of the type shown in Figs. 3 and 5 of the drawings; the boards designated B and B' in these tables being generally referred to as polyethylene coated of the type shown in Figs. 2 and 4 of the drawings; the boards C and C' being generally referred to as wax laminated with liner of the type shown in Fig. 3 of our copending application, Serial No. 269,046, filed January 30, 1952; while the boards D and D' are typical commercially known asphalt saturated boards utilized as panelboard for vehicle bodies.

Another important and outstanding characteristic of the composite boards of this invention is that such boards also have unusual dimensional stability on exposure to high relative humidity conditions during long periods of use as compared with commercially known boards. This is illustrated by Table II.

TABLE II

*Stability on exposure to high relative humidity*

|  | Percent Gain in Weight from 50% Rel. Humidity to 85% Rel. Humidity at 95° F. (12 hrs. minimum exposure) | Dimensional Change, Inches per 36 in. |
|---|---|---|
| Board A | 1.3 | .036 |
| Board A' | 0.0 | .018 |
| Board B | 0.0 | 0.0 |
| Board B' | 0.0 | 0.0 |
| Board C | 2.25 | 0.050 |
| Board C' | 1.4 | 0.054 |
| Board D | 3.7 | 0.160 |
| Board D' | 4.7 | 0.150 |

Still another important and outstanding characteristic of the boards of this invention is that such boards exhibit excellent water resistance after heat treatment as illustrated by Table III.

TABLE III

*Resistance to water sorption after heat treatment*

*Per weight increase after 24 hr. water immersion, 20 min. heat treatment prior to water immersion at temperatures specified.*

|  | 160° F. | 180° F. | 200° F. | 225° F. |
|---|---|---|---|---|
| Board A | 17.3 | 15.0 | 19.6 | 16.7 |
| Board A' | 13.6 | 19.2 | 15.5 | 17.8 |
| Board B | 7.5 | 9.0 | 10.2 | 11.1 |
| Board B' | 14.6 | 13.5 | 7.8 | 9.7 |
| Board C | 10.4 | 14.8 | 34.6 | 37.2 |
| Board C' | 10.2 | 12.8 | 18.9 | 59.1 |
| Board D | 41.1 | 39.8 | 45.8 | 46.3 |
| Board D' | 41.7 | 47.2 | 44.7 | 42.0 |

Dielectric heating referred to above, employs the application of a rapidly oscillating electric field to the material in which heat is to be generated. This heat is developed by the continued rapid alternating molecular motion which creates heat by molecular friction within the material.

By referring to Table III, it will be readily appreciated that the composite panelboard materials of the present invention are especially suitable for fabricating operations requiring a relatively high temperature heat treatment, as for example, dielectric heating, electrically heated platens, etc. by virtue of the fact that such high temperature heat treatment does not destroy the water resistance of the composite boards of this invention.

Thus, it becomes apparent that the composite boards produced in accord with this invention are dimensionally stable and have unusually low moisture vapor and water sorption characteristics attributable to the synergistic action of the board components, in contradistinction to known board structures, as for example, the asphalt saturated structures set forth in Tables I, II and III.

So far the invention has been described with particular reference to the progressive manufacture of composite board structures such as shown in Figs. 4 and 5. The invention may also be applied, however, with advantage to the manufacture of interior trim panels by joining or uniting a fabric covering 5, adhesively, by heat bonding or by a sewing operation, to an exposed surface of the composite board A as shown in Fig. 6. As illustrated by Fig. 7, such a trim panel may readily be applied to an automobile door C, by various methods well known in the art.

Moreover, if desired, a single ply or multi-ply board having a protective barrier layer or film of water and water-vapor proof material 3, covered by a protective liner 4, may be manufactured and sold as a signboard material, to be later processed with a printing material. For example, for outdoor sign use, a waterproof printing paper may be used as the liner to provide for a high level graphic arts reproduction of printed matter.

The invention accordingly provides an inexpensive composite board material of high quality which because of its construction is not subject to objectionable edge wicking even during long periods of water immersion after such board has been exposed to high temperatures as described and hence is readily adapted for automotive use, outdoor signboards and the like. The various elements of the composite board have been assembled and combined to produce synergistically a highly useful, dimensionally stable structure.

While the method and product herein described constitute preferred embodiments of the invention, it is to be understood that the invention is not limited to this precise method and product, and that changes may be

We claim:

1. A composite substantially rigid and dimensionally stable panel structure comprising in combination an integral internal fiber board assembly consisting of a plurality of laminae of board filler elements with a layer of water insoluble adhesive between adjacent laminae, each of said laminae having incorporated therein a water repellent material to render said laminae substantially water impervious and said water impervious laminae being joined into said integral fiber board assembly by said water insoluble adhesive layer between said laminae, and a water, water vapor proof and relatively high heat resistant continuous barrier film of resinous material adhered to and in direct contact with each of the outer surfaces of said fiber board assembly and substantially uniformly distributed over said surfaces to effectively prevent diffusion of water and water vapor into said fiber board assembly, said barrier film composed of polyethylene film forming material, said water repellent material substantially prohibiting penetration of said barrier film into the fiber structure of said board filler elements, said panel structure by reason of said water repellent material, said water insoluble adhesive and said barrier film having low moisture vapor, water transmission, sorption and relatively high temperature heat resistant characteristics whereby said composite panel structure is rendered stable against warping and dimensional change from exposure to water, conditions of high relative humidity and conditions of relatively high temperature heat treatment.

2. A composite panel structure as defined in claim 1 wherein a sheet of liner material is adhered to one of said barrier films.

3. A composite panel structure as defined in claim 1 wherein a sheet of liner material is adhered to each of said barrier films.

4. A composite panel structure as defined in claim 1 wherein said water insoluble adhesive between adjacent laminae is present in an amount of the order of two pounds per thousand square feet.

References Cited in the file of this patent

UNITED STATES PATENTS

| | | |
|---|---|---|
| 1,910,671 | Blum | May 23, 1933 |
| 1,998,590 | Randall | Apr. 23, 1935 |
| 2,073,894 | Wood | Mar. 16, 1937 |
| 2,075,317 | Upson | Mar. 30, 1937 |
| 2,212,314 | Bauer et al. | Aug. 20, 1940 |
| 2,219,700 | Perrin et al. | Oct. 29, 1940 |
| 2,227,212 | Beck | Dec. 31, 1940 |
| 2,405,423 | Hayes | Aug. 6, 1946 |
| 2,453,644 | Steinkraus | Nov. 9, 1948 |
| 2,548,029 | Kurtz et al. | Apr. 10, 1951 |
| 2,551,087 | Barnhart et al. | May 1, 1951 |
| 2,598,090 | Yung et al. | May 27, 1952 |
| 2,601,114 | Gillespie | June 17, 1952 |
| 2,629,699 | Moore | Feb. 24, 1953 |

FOREIGN PATENTS

| | | |
|---|---|---|
| 491,804 | Great Britain | Sept. 8, 1938 |